Feb. 20, 1940.  R. J. KITTREDGE  2,191,109
LOCATING DEVICE FOR MAPS
Filed May 7, 1937  2 Sheets-Sheet 1

Inventor:
Rufus J. Kittredge.
By: Robert F. Miehle, Jr.
Atty.

Feb. 20, 1940.    R. J. KITTREDGE    2,191,109
LOCATING DEVICE FOR MAPS
Filed May 7, 1937    2 Sheets—Sheet 2
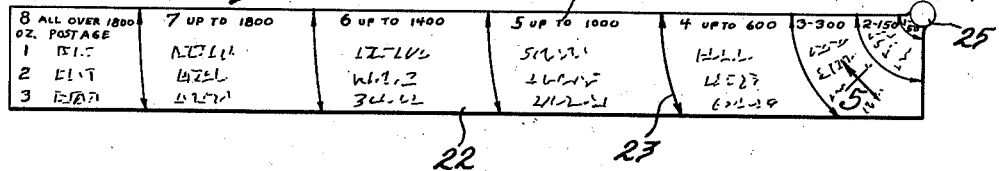
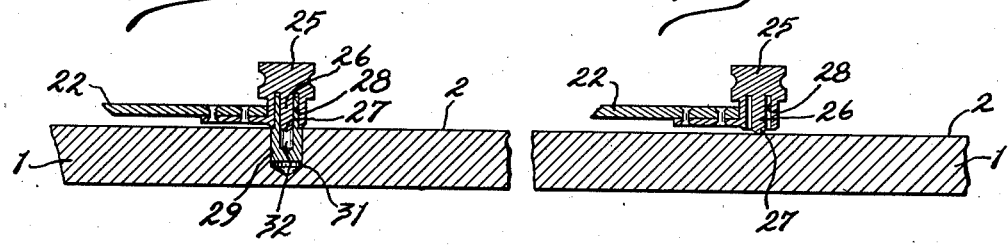
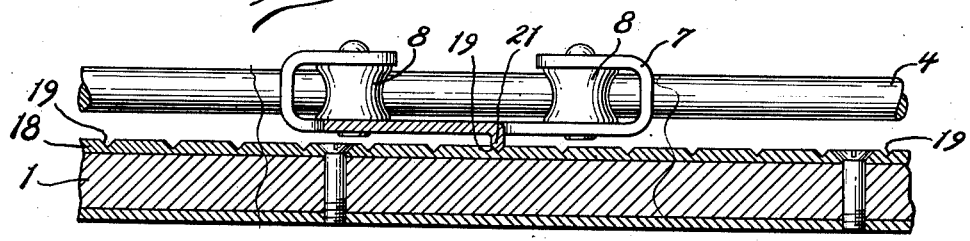
Inventor:
Rufus J. Kittredge.
By: Robert F. Miehle, Jr.
atty.

Patented Feb. 20, 1940

2,191,109

UNITED STATES PATENT OFFICE 2,191,109

LOCATING DEVICE FOR MAPS

Rufus J. Kittredge, Evanston, Ill.

Application May 7, 1937, Serial No. 141,338

3 Claims. (Cl. 35—40)

My invention relates particularly to locating devices for maps for determining parcel post zone rates between given points on a map, although not limited to this use alone.

The general object of the invention resides in the provision of a novel locating device for a map whereby points, such as cities or towns, may be quickly and conveniently located and the distances therebetween may be likewise quickly and conveniently determined, particularly with a view toward determining parcel post zone rates between given points, the invention also involving an index which promotes the quick and convenient location of desired locations on the associated map.

With this object in view my invention consists in certain features of novelty in the construction, combination and arrangement of parts by which the said object and certain other objects, hereinafter appearing, are effected, all as fully described with reference to the accompanying drawings and more particularly pointed out in the appended claims.

In the said drawings—

Figure 3 is a partial sectional view substantially on the line 3—3 of Figure 2;

Figure 4 is a face elevation of the pivot bar of the device, hereinafter described;

Figures 5 and 6 are partial sections substantially on the line 5—5 of Figure 4 and involving portions of the map structure; and Figure 7 is a partial face view of an index of different points on the map for use with the locating device.

Figures 1, 2:
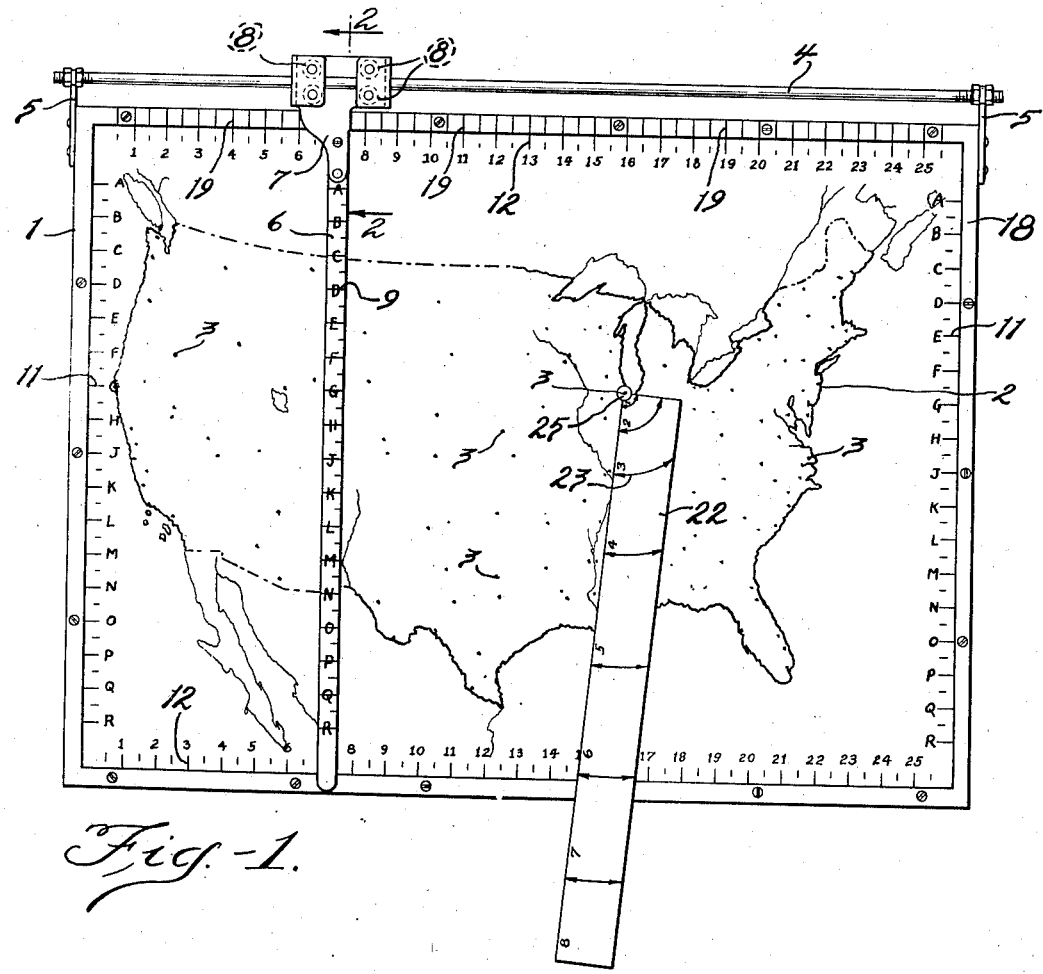
Figure 1 is a face elevation of a map provided with the locating device of my invention.
Figure 2 is a partial sectional view substantially on the line 2—2 of Figure 1.

Referring to Figures 1 to 6 of the drawings, 1 designates a rigid rectangular map structure, bearing a usual map 2 on the upper face thereof which involves coordinated locations 3, such as cities and towns.

A bearing rod 4 extends along the upper side of the map structure and is secured thereto by means of brackets 5. A traverse bar 6 is provided with a bearing bracket 7 at one end thereof, on which bracket two spaced pairs of grooved bearing rollers 8 are mounted. These pairs of rollers are spaced transversely of the traverse bar 6 and engage the bearing rod 4 therebetween to provide a bearing whereby the traverse bar is bodily movable transversely of its length across the map and is pivotally movable facewise of the map.

The traverse bar 6 is thus vertically positioned and is bodily movable horizontally across the map, and is provided with a longitudinally extending vertically locating scale 9. The vertical sides of the map are preferably provided with corresponding vertically locating scales 11 for the same purpose.

The horizontal sides of the map are provided with horizontally locating scales 12. In locating a desired point on the map reference is first made to an index 13, such as shown in Figure 7, which preferably involves a single alphabetical listing 14 of all locations 3 on the map, such as cities and towns on the effective area of the map, rather than by states or the like, together with designations 15 of states or the like, to designate cities or towns of the same names in different states or the like, individual horizontal scale designations 16 corresponding with the designations on the horizontally locating scales 12 on the map and individual vertical scale designations 17 corresponding with the designations on the vertically locating scale 9 of the traverse bar and the vertically locating scales 11 on the map.

Accordingly, by reference to the coordinated index to locate a given location on the map, the traverse bar 6 is moved horizontally to the indicated horizontal location, and the vertical location is preferably determined on the scale 9 with obvious convenience. Another given location is obtained in the same manner. However, any location on the map may be determined by reference to the index and a resort to the map scales 11 and 12, leaving the traverse bar 6 in the horizontal location of the past mentioned location. Obviously, the traverse bar may be used in determining a second location on the map at the choice of the user.

The upper face of the map structure is provided with a metal margin element 18 fixed therewith and the upper horizontal side thereof, which is adjacent the bearing rod 4, is provided with a longitudinally extending series of uniformly spaced interlock notches 19 which are spaced along the bodily movement of the traverse bar 6 and which correspond in their spacing with the locating scales 12. The bracket 7 of the traverse bar 6 is provided with an interlock projection 21 which is engageable and disengageable with any of the notches 19 with pivotal movement of the traverse bar facewise of the map for selectively and releasably securing the traverse bar in different positions of its said bodily movement. As arranged, when the traverse bar is positioned in its pivotal movement adjacent the face of the map 2, the projection 21 is engaged in one of the notches, and when the traverse bar is positioned away from the face of the map, as shown in broken lines in Figure 2, the traverse bar is released for its said bodily movement.

Use of the traverse bar by reference to the index 13 and the locating scales 12 is obvious, it being observed that the releasable securing of the traverse bar in a selected position tends toward quickness and convenience in that accidental shifting of the traverse bar is prevented, the vertical location of a desired location on the map being determined by reference to the scale 9 after the horizontal location thereof is found and the traverse bar correspondingly positioned.

A pivot bar 22 is provided with a longitudinally extending distance scale 23, which, as shown, corresponds with parcel post zone distance and is provided with corresponding data 24. See particularly Figure 4. A pivot element, generally designated at 25, is mounted at one end of the pivot bar 22 and is coordinated with the distance scale 23.

This pivot element comprises a cylindrical pivot bearing stud 26 provided with an additional pointed pivot formation 27 on the extending end thereof and a coaxial internal cylindrical bearing surface 28 formation surrounding the stud 26 and from which the pointed end 27 extends. See Figures 4, 5 and 6.

Another cylindrical pivot element 29 is permanently engaged against removal or sealed in a bore 31 of the map structure 1 at a position thereon corresponding with the location at which the particular map is to be used or with the location from which distances are to be most generally determined. The pivot element 29 is provided with a concentric bearing bore 32, to the end that the stud 26 is engageable in the bore 32 and the bearing surface 28 is engageable with the exterior surface of the pivot element 29, to provide a releasable pivot mounting operative between the map and the pivot bar.

This pivot mounting involves a cylindrical bearing engagement extending an appreciable distance axially to the end that the pivot bar is held thereon against accidental displacement, in as much as the pivot bar is generally used in computing distances from the location of the bearing element 29. See Figures 1 and 5.

As above mentioned, the device is designed primarily for determining parcel post zones from selected points on the map. The permanent pivot element 29 is preferably coordinated with the location at which the map is to be used, as at the related post office, and serves for more conveniently determining parcel post zones from this location, the pivoted or parcel post zone bar being preferably generally pivotally engaged on the map at the most used location.

However, the bearing engagement of the pivot members 25 and 29 is disengageable with relative axial movement thereof for computing distances from other locations on the map. In such case the pointed end 27 of the stud 26 is engageable at other selected positions on the face of the map to provide a pivot for the pivot bar.

While I have thus described my invention, I do not wish to be limited to the precise details prescribed, as changes may readily be made without departing from the spirit of my invention, but having thus described my invention, I claim as new and desire to secure by Letters Patent the following:

1. In a device of the character described, the combination with a map, of a traverse bar provided with a longitudinally extending locating scale, bearing means whereby said traverse bar is bodily movable transversely of its length across said map and is pivotally movable facewise of said map, releasable means for selectively securing said traverse bar in selected positions of its bodily movement and adapted to release with pivotal movement of said bar away from said map, and said map being provided with a locating scale extending correspondingly with the bodily movement of said traverse bar for locating the same in its bodily movement.

2. In a device of the character described, the combination with a map, of a traverse bar provided with a longitudinally extending locating scale, bearing means whereby said traverse bar is bodily movable transversely of its length across said map and is pivotally movable facewise of said map, releasable means for selectively securing said traverse bar in predetermined spaced positions of its bodily movement comprising a series of interlock formations on said map and spaced along the bodily movement of said traverse bar and a cooperating interlock formation on said bar engageable and disengageable with any of said series of interlock formations with said pivotal movement of said bar, and said map being provided with a locating scale extending correspondingly with the bodily movement of said traverse bar for locating the same in its bodily movement and corresponding with said series of interlock formations.

3. In a device of the character described, the combination with a map, of a traverse bar provided with a longitudinally extending locating scale, bearing means whereby said traverse bar is bodily movable transversely of its length across said map and is pivotally movable facewise of said map comprising a bearing rod fixed with and extending along one side of said map and pairs of spaced revoluble bearing rollers carried with and spaced transversely of said bar and engaging said rod therebetween, releasable means for selectively securing said traverse bar in predetermined spaced positions of its bodily movement comprising a series of interlock formations on said map and spaced along the bodily movement of said traverse bar and a cooperating interlock formation on said bar and engageable and disengageable with any of said series of interlock formations with said pivotal movement of said bar, and said map being provided with a locating scale extending correspondingly with the bodily movement of said traverse bar for locating the same in its bodily movement and corresponding with said series of interlock formations.

RUFUS J. KITTREDGE.